United States Patent
McCue

(10) Patent No.: US 6,732,140 B1
(45) Date of Patent: May 4, 2004

(54) SYSTEM AND METHOD FOR DYNAMIC ALLOCATION OF SOFTWARE RESOURCES

(75) Inventor: Kevin C. McCue, Escondido, CA (US)

(73) Assignee: Northrop Grumman Corporation, Redondo Beach, CA (US)

(*) Notice: Subject to any disclaimer, the term of this patent is extended or adjusted under 35 U.S.C. 154(b) by 0 days.

(21) Appl. No.: 09/514,139

(22) Filed: Feb. 28, 2000

(51) Int. Cl.[7] ............................. G06F 9/00
(52) U.S. Cl. ................... 709/104; 709/100; 709/102; 712/25
(58) Field of Search ................ 395/674, 800; 709/104, 102, 100; 712/25

(56) References Cited

U.S. PATENT DOCUMENTS

| | | | | |
|---|---|---|---|---|
| 4,685,125 A | * | 8/1987 | Zave | 700/1 |
| 4,959,854 A | * | 9/1990 | Cave et al. | 379/157 |
| 5,019,961 A | * | 5/1991 | Addesso et al. | 700/87 |
| 5,430,850 A | * | 7/1995 | Papadopoulos et al. | 709/314 |
| 5,560,029 A | * | 9/1996 | Papadopoulos et al. | 712/25 |
| 5,826,082 A | * | 10/1998 | Bishop et al. | 709/104 |
| 5,838,968 A | * | 11/1998 | Culbert | 709/104 |
| 5,841,972 A | * | 11/1998 | Fanshier | 709/220 |
| 6,092,118 A | * | 7/2000 | Tsang | 709/246 |
| 6,112,237 A | * | 8/2000 | Donaldson et al. | 709/224 |
| 6,230,156 B1 | * | 5/2001 | Hussey | 707/10 |
| 6,298,370 B1 | * | 10/2001 | Tang et al. | 709/102 |
| 6,304,564 B1 | * | 10/2001 | Monin et al. | 370/338 |
| 6,442,169 B1 | * | 8/2002 | Lewis | 370/401 |

OTHER PUBLICATIONS

Curtis et al., Collaborative object architecture. US. Pat. Application Publication No. US 2002/0052932 A1.*

Hawkinson, Christopher. Apparatus and method for classifying information received by a communication System US. Pat. Application Publication No. 2002/0007360 A1.*

* cited by examiner

Primary Examiner—Majid A. Banankhah
Assistant Examiner—Lilian Vo
(74) Attorney, Agent, or Firm—Tarolli, Sundheim, Covell & Tummino L.L.P.

(57) ABSTRACT

A system, method and computer program that configures software threads (95) at the time requested using only the required software resource elements (70) necessary to perform a specific function. This is accomplished using a resource manager (30) to identify resource elements (70) required to perform the specific function by accessing a resource database (40) associating commands with resource elements (70). Once the required resource elements (70) are identified, message labels are generated to activate and pass parameters to the resource elements (70) using a message allocation table (50). These messages labels are routed to the memory locations where the resource elements (70) are stored using a message routing table (60). Upon receipt of the message labels the resource elements (70) activate and form a thread (95) using message labels, generated by each resource element (70) in the thread (95) to communicate with other resource elements (70) in the thread (95).

18 Claims, 6 Drawing Sheets

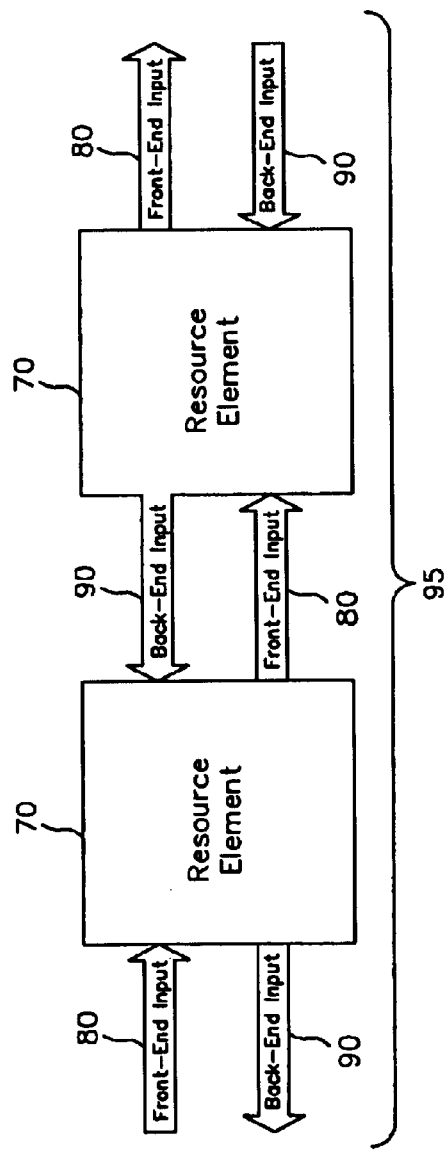

Fig.2

| Resource Element | Front-End Input | Back-End Input |
|---|---|---|
| UHF/VHF #1 Software Components | Message Label 10 | Message Label 20 |
| UHF/VHF #2 Software Components | Message Label 11 | Message Label 21 |
| UHF/VHF #3 Software Components | Message Label 12 | Message Label 22 |
| UHF Guard Software Components | Message Label 13 | Message Label 23 |
| VHF Guard Software Components | Message Label 14 | Message Label 24 |
| VHF FM #1 Software Components | Message Label 15 | Message Label 25 |
| VHF FM #2 Software Components | Message Label 16 | Message Label 26 |
| SATCOM Narrow Band DAMA S/W | Message Label 17 | Message Label 27 |
| Etc. | | |

Fig.3

SYSTEM AND METHOD FOR DYNAMIC ALLOCATION OF SOFTWARE RESOURCES

STATEMENT REGRADING FEDERALLY SPONSORED RESEARCH OR DEVELOPMENT

This invention was made with Government support under contract number DAAJ09-C-A004 awarded by the United State Army. The Government has certain rights in the invention.

FIELD OF THE INVENTION

The invention relates to a system, and method for the dynamic allocation of software resources. More particularly, the invention employs a system, method and computer program to determine the software modules required to fulfil requests for fixed band radio functions and dynamically allocate those software modules upon demand.

BACKGROUND OF THE INVENTION

Over the relatively short history of the computer industry dramatic changes have occurred. The most significant of these changes has been the incredible drop in hardware prices along with the equally incredible improvement in performance. However, the cost of developing, maintaining and troubleshooting software has not seen improvement nearly as dramatic as seen in hardware. Today, the cost of developing, maintaining and troubleshooting software can dwarf the cost of the hardware involved, particularly in the case of complex military, government and business systems.

The high cost of developing, maintaining and troubleshooting software can be attributed to many factors. A few of these factors include: the every increasing complexity of the software due to an ever increasing demand in functionality, a frequent shortage of trained and experienced programmers; and the need for more rigorous testing of this more complex software.

Throughout the history of the computer industry many attempts have been made to reduce the cost of developing, testing and maintaining software. In the early 1960s, the COBOL programming language was developed to facilitate the coding, maintenance and porting of business applications. In the 1970s, structured programming languages such as Pascal and C were developed. In the 1980s, objected oriented languages such as C++ and Ada were developed and in the 1990s common object models (COM objects) were also created.

However, even with the advent of structured, modular and object oriented programming techniques, a programmer is frequently required to create a single large monolithic program, or what is even worse is that a program has features added to so that over time it turns into a large complex piece of code. The requirement for large programs is necessitated by the requirement that a single program must perform all functions related to a given activity. Unfortunately, when executing such a large piece of software, only a small portion is executed to perform any single given function. The remaining code is there in case the program is called upon to perform any of its other functions. Therefore, most of the time a great deal of the code in a software program is simply excess baggage.

However, this excess baggage (code) cannot be simply thrown away. All the code is needed in order to perform all the functions related to a particular activity. Unfortunately, the presence of such code makes designing, generating and testing the code difficult. It further makes maintaining it even more difficult and thus expensive. A modification to one portion of a program can often have detrimental consequences to other unrelated portions of a program. Therefore, extensive testing is required of all features of a program when a new feature is added or modified. This is particularly true when the software is used in aerospace or military applications where an error can cost human lives.

Of particular concern to the military is the flexibility to utilize the components available to accomplish a particular function. For example, the Comanche helicopter can support a VHF-AM radio, two UHF radios, two VHF-FM radios, and one satellite communications interface. Each one of these communications devices would require several pieces of hardware and some form of controlling software. In combat it can be anticipated that some hardware and processors may be lost. However, a combat aircraft should not, and may not be able to, be taken out of action due to the loss of a portion of a radio system or subsystem. Therefore, the military has designed the required radio communications software in such a way as to be able to use the hardware available to continue operations. However, this has required large complex software programs to be developed and extensively tested to handle every possible configuration of hardware which is a time consuming and expensive process.

Therefore, what is needed is a system, method and computer program in which, upon receiving a request to perform a certain function, only those portions of code that are needed to perform a function will be brought together at that time and executed. These portions of code should be independent of each other and thus have the ability to be tested independently and therefore simply. However, these portions of code should, when brought together, be able to work together to perform the requested function. These code segments or modules must able to communicate to any other code segment or module and thereby can be configured to work together and adapt as the needs change.

SUMMARY OF THE INVENTION

An embodiment of the present invention provides for a method of configuring a thread to perform a specific function. This method begins by identifying at least one resource element required to perform the specific function. It then generates a message label having several parameters required by the resource element to perform the specific function. This message label is then transmitted to the resource element. Upon receipt of the message label, the resource element is activated to perform the specific function.

Further, an embodiment of the present invention creates a system to configure a thread to perform a specific function. This system uses a mission interface manager to receive a request to generate a thread that performs the specific function. The system also has a resource manager which communicates with the mission interface manager. This resource manager identifies the resource elements required to generate a thread. The resource manager also generates several message labels which are transmitted to the resource elements in order to form the thread.

Still further, an embodiment of the present invention is a computer program executable by a computer and embodied on a computer readable medium to configure a thread to perform a specific function. This computer program uses a mission interface manager code segment to receive a request to generate a thread that performs a specific function. The computer program also has a resource manager code segment that communicates with the mission interface manager code segment. The resource manager code segment identifies the resource elements required to generate the thread. The resource manager also generates several message labels that are transmitted to the resource elements in order to form the thread.

These and other features of this system, method and computer program will become more apparent from the following description when taken in connection with the accompanying drawings which show, for purposes of illustration only, examples in accordance with the present invention.

BRIEF DESCRIPTION OF THE DRAWINGS

The foregoing and a better understanding of the present invention will become apparent from the following detailed description of exemplary embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto. The spirit and scope of the present invention are limited only by the terms of the appended claims.

The following represents brief descriptions of the drawings, wherein:

FIG. 2 is diagram showing an example of a message allocation table used in the embodiments of the present invention;

FIG. 3 is diagram showing an example of input message labels and output message labels interfacing to resource elements;

DETAILED DESCRIPTION

Figure 1:
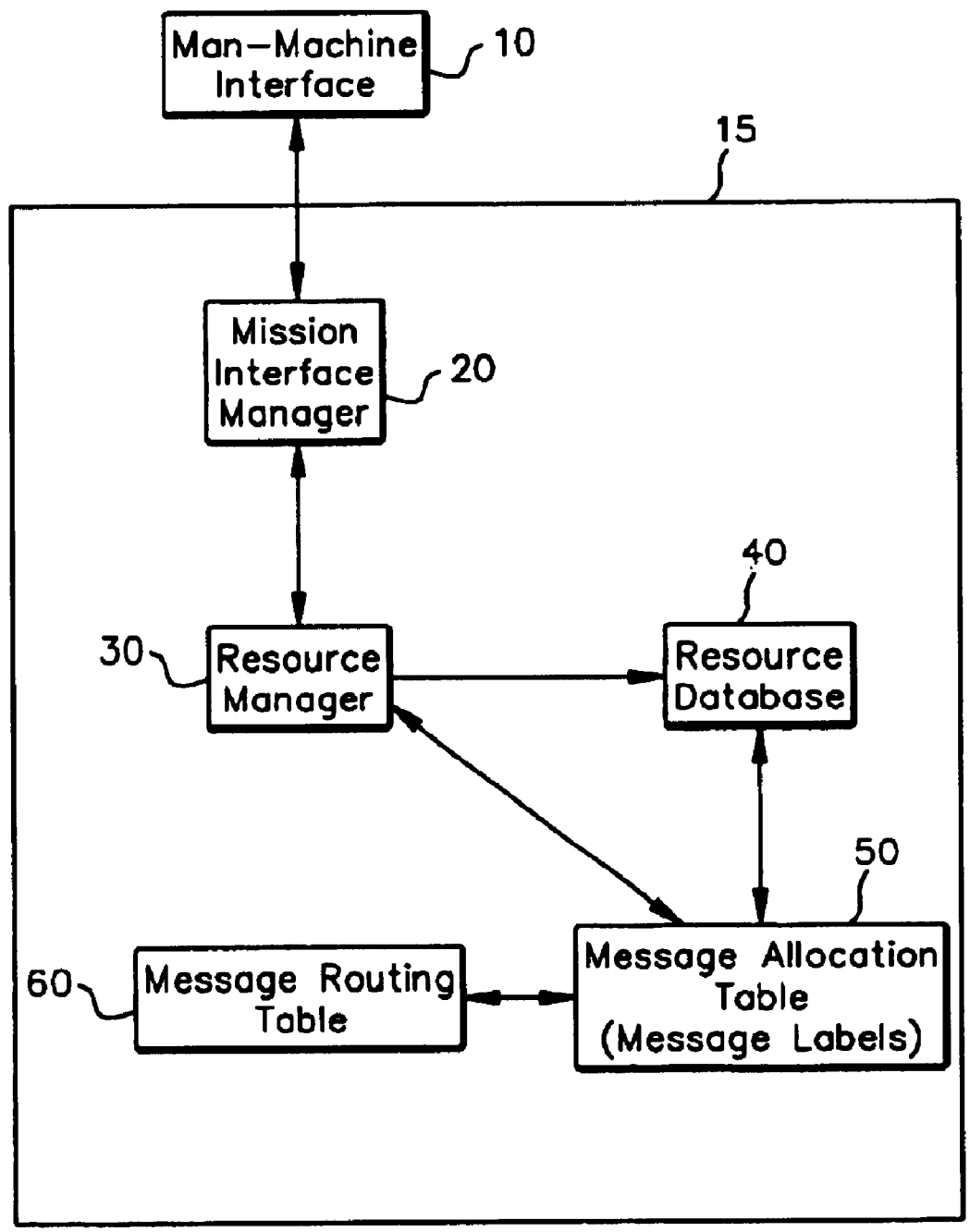
FIG. 1 is an example of an overall system diagram of an embodiment of the present invention.

Before beginning a detailed description of the subject invention, mention of the following is in order. When appropriate, like reference numerals and characters maybe used to designate identical, corresponding or similar components in differing figure drawings. Further, in the detailed description to follow, exemplary sizes/models/values/ranges may be given, although the present invention is not limited to the same.

FIG. 1 illustrates an example of an embodiment of the present invention in which the software required to perform a specific task is identified, assembled and configured on an as needed basis. The blocks illustrated in FIG. 1 represent modules, code, code segments, commands, firmware, hardware, instructions and data that are executable by a processor-based system(s) and may be written in a programming language, such as, but not limited, to C++. The discussion provided below is directed to a radio subsystem such as that used on the Comanche military attack helicopter. However, as would be appreciated by one of ordinary skill in the art, the embodiments of the present invention may be used in numerous software applications.

When the embodiments of the present invention, as exemplified in FIG. 1, receive a request to setup a particular radio thread 95 on a channel, the present invention must first determine if sufficient resources exist to satisfy the request. Limited antenna resources on a combat aircraft, such as a Comanche helicopter, can support only one VHF-AM radio thread 95, two UHF radio threads 95, two VHF-FM radio threads 95, and one satellite communications radio thread 95 at a time. Because of these limited resources, the pool of software resources only has to be sufficient to support these radio threads 95 which reduces the software memory and storage requirements. If some of the hardware modules are not functioning, then further restrictions apply. If a processor module fails, then some of the software components may not be available. The present invention makes the best use of the available resources to support the maximum number of specified radios.

As will be discussed in further detail ahead, the embodiments of the present invention will first find the resources required to setup a radio thread 95, allocate them to the thread 95, and then logically connect these pieces together. All data flows through the system as message packets. These packets specify a target destination via a message label, which may require routing to multiple destinations. By assigning the appropriate message label at thread 95 setup, a particular hardware or software resource can support different threads 95. The message labels for a particular hardware or software resource are contained in a message allocation table 50 discussed in detail ahead.

Referring to FIG. 1, the embodiment shown uses a man-machine interface 10 used to communicate to the user. This man-machine interface 10 may take the form of, but not limited to, a keyboard, mouse, track ball, touch screen, voice recognition system, control panel, or any other human to processor interface. The function of the man-machine interface 10 is to allow a user to input commands, data and parameters to the embodiments of the present invention. The man-machine interface 10 communicates the information received from the user to the mission interface manager 20 which, as indicated in FIG. 1, is part of the radio subsystem 15, however the embodiments of the present invention may be used for any type of application. The mission interface manager 20 accepts the input from the man-machine interface 10 and continuously monitors for any further input. The mission interface manager 20 includes, but is not limited to, operation 100, shown in FIG. 4 and operation 300 shown in FIG. 5.

Figure 4A:
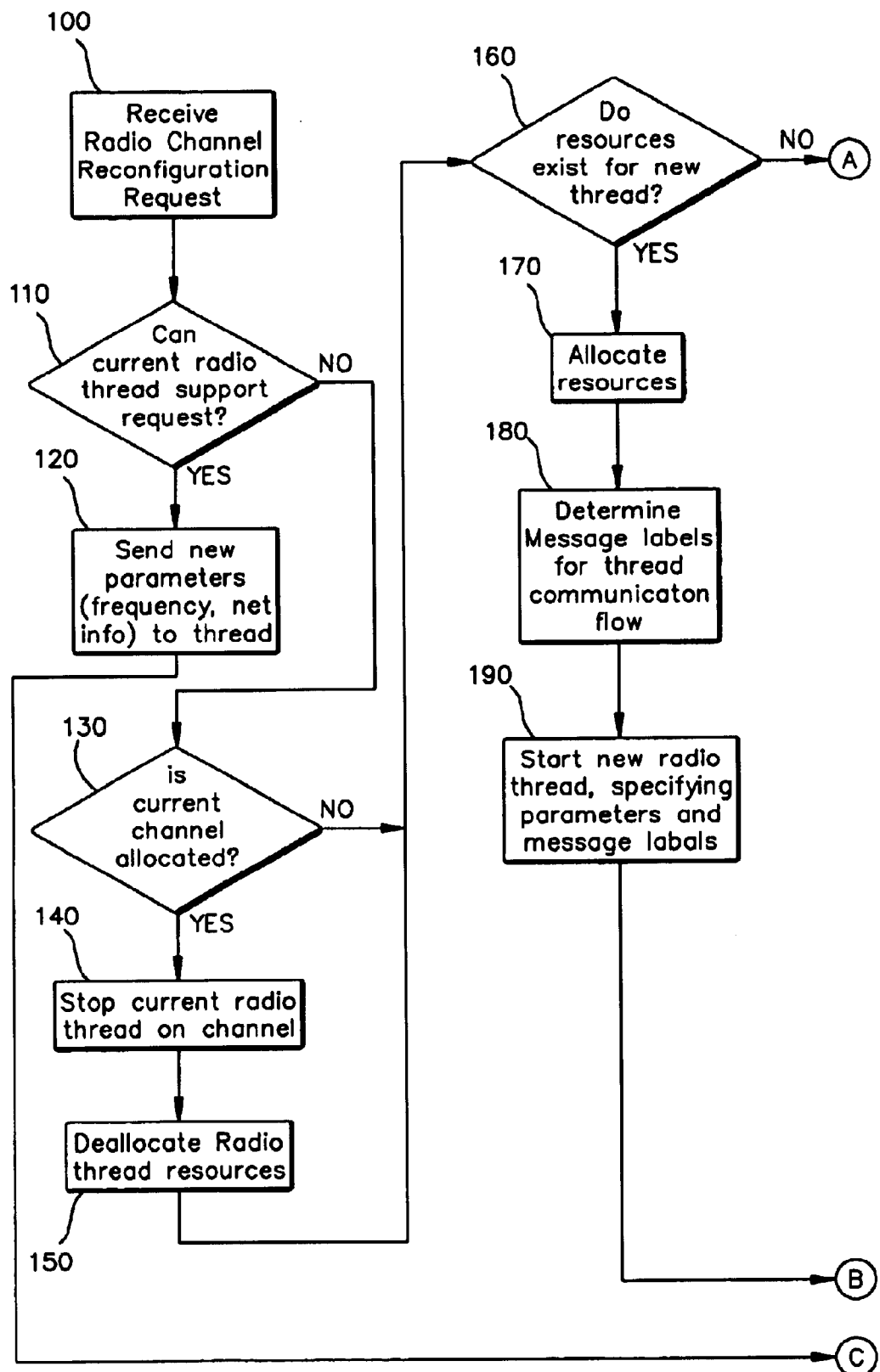
FIG. 4 is a flowchart of an example embodiment of the present invention.
Figure 4B:
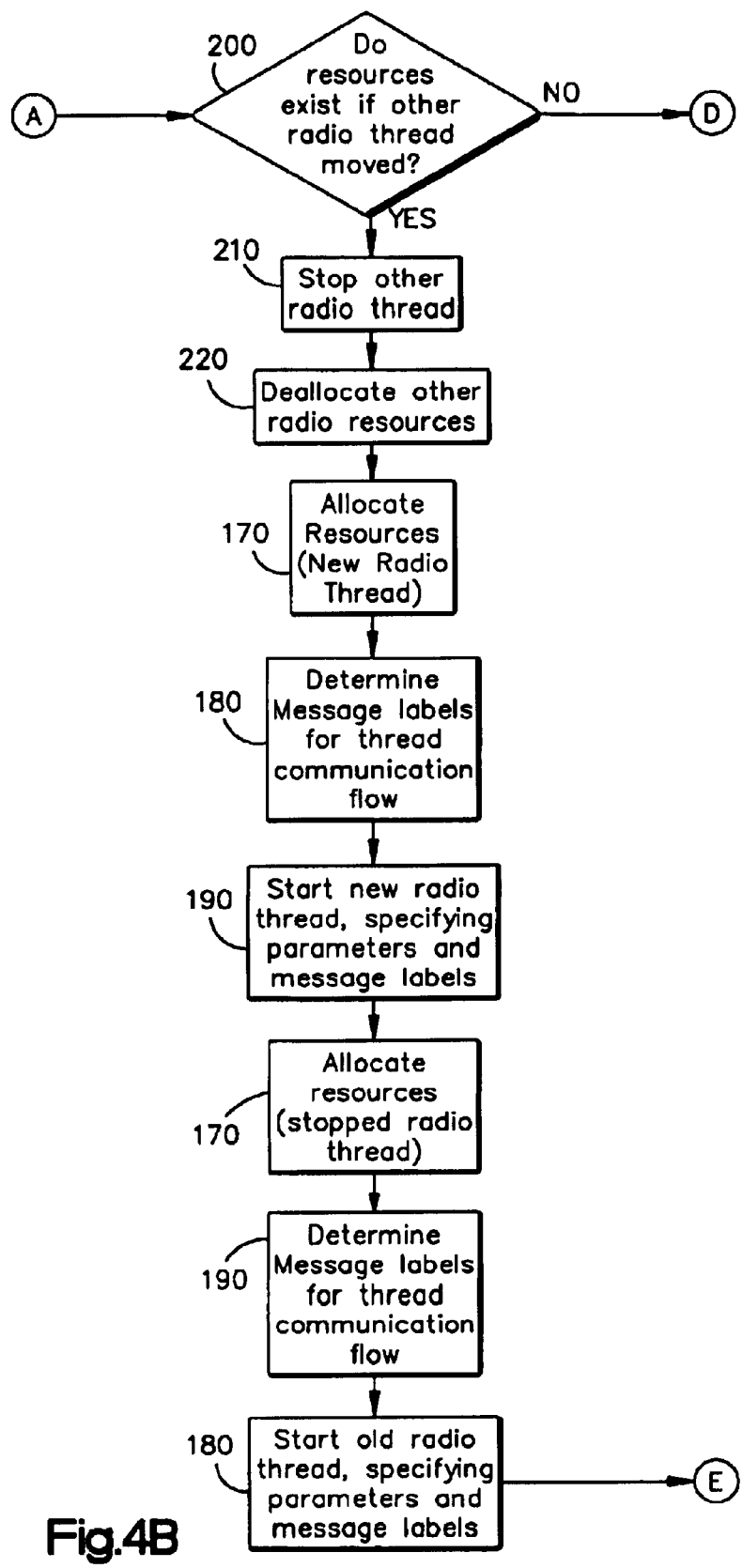
Figure 4C:
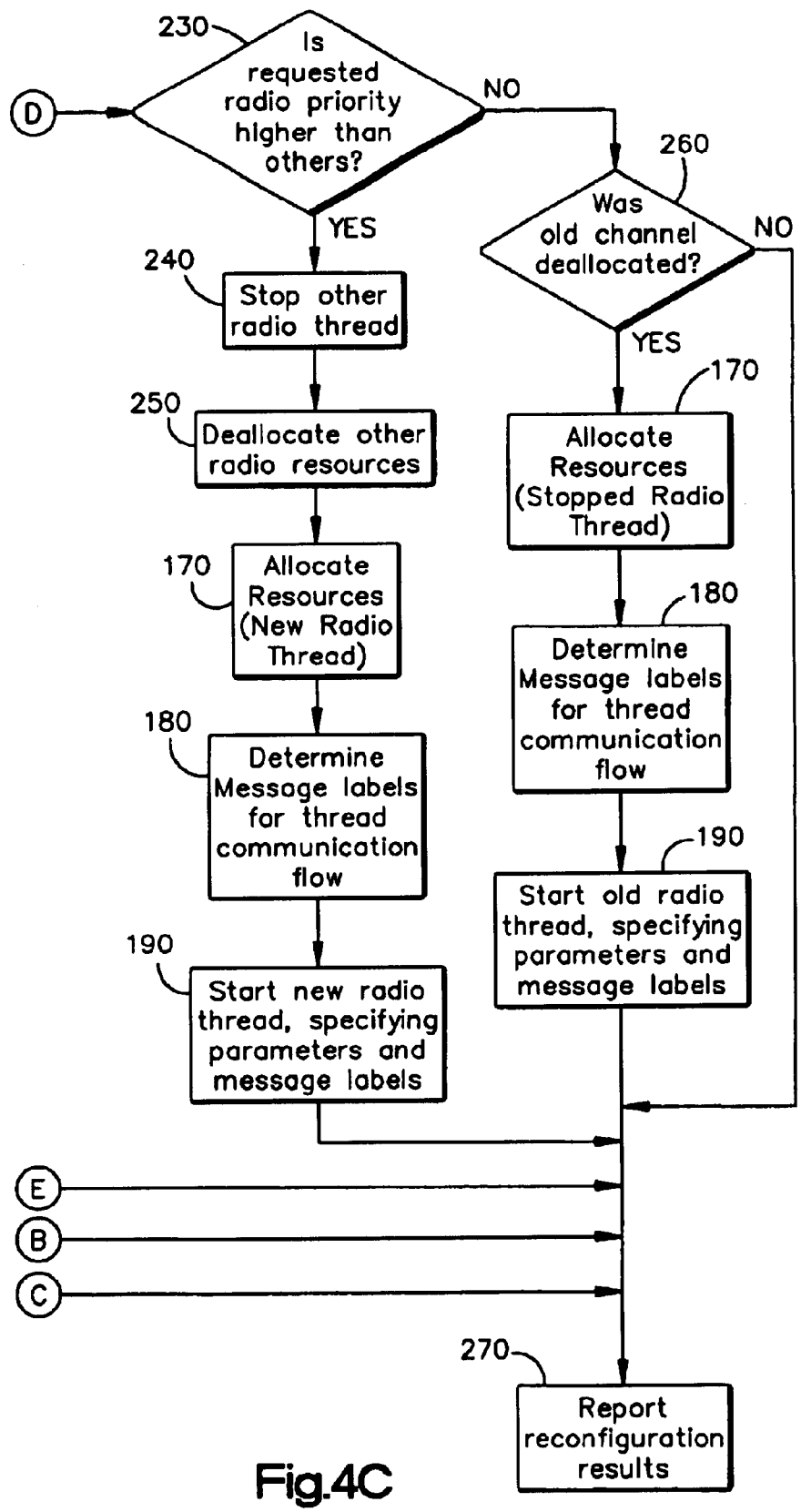
Figure 5:
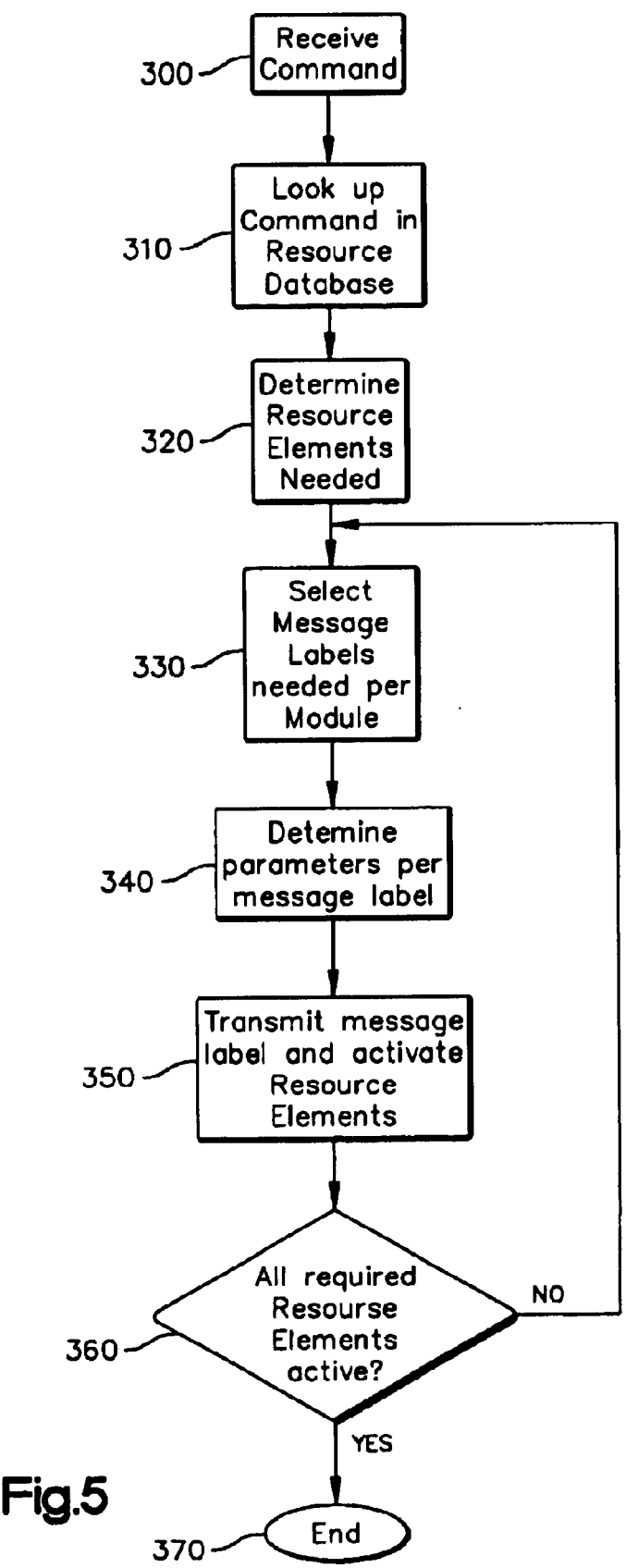
FIG. 5 is a flowchart of another example embodiment of the present invention.

Still referring to FIG. 1, the mission interface manager 20 transmits the command, instructions, or data received to a resource manager 30 which includes operation 110 through 270, shown in FIG. 4, and operations 300 though 370, shown in FIG. 5. The resource manager 30 accesses a resource database 40 to determine the resource elements 70, shown in FIG. 2 and FIG. 3, required to execute a specific command or instruction. The resource manager 30 will also determine if the software component is available for execution as discussed in further detail in the reference to FIG. 4 and FIG. 5. The resource manager 30 will also access a message allocation table 50 to determine the message labels required by each resource element 70. There are two types of message labels including a front-end input 80 and a back-end input 90, shown and discussed in further detail in reference to FIG. 2 and FIG. 3. In addition, a message routing table 60 is used by the message labels to determine where to go to find the required resource element 70. This is particularly useful in a system having several processors and several computers connected through ports or other well known communications hardware. Using such a message routing table 60, a message label would be able to locate a resource element 70 in another computer system.

FIG. 2 is an example of a message allocation table 50 having at least three parts including a resource element 70 and two types of message labels associated therewith. These message label types are a front-end input 80 and a back-end input 90. The message labels would further indicate the types of parameters required for each message label. Using the example of a radio subsystem 15, resource elements 70 related to the radio subsystem 15 are shown in FIG. 2. For example, resource element 70 may include a UHF guard software component which encrypts data prior to transmission.

FIG. 3 is an example of the interaction between a resource element 70 and message labels which include both front-end input 80 and back-end input 90. It should be noted that a resource element can both receive and transmit message labels simultaneously. This is done for two reasons. First, the ability to both transmit and receive data is necessary in a two-way communications systems. Second, a series of resource elements may be threaded or daisy chained to other resource elements which are required to establish a communications link or perform a certain function. The combination of one or more resource elements 70 and message labels would form a thread 95.

Using the example of a radio subsystem 15, a helicopter pilot may select to speak to another helicopter or ground station over a VHF FM channel #1 which is encrypted. This would require at least two of the resource elements 70, shown in FIG. 2, including the VHF guard software component to encrypt and pass the data to the VHF FM #1 software component to transmit and receive data over the selected channel or port. Therefore, one VHF software component would use front-end message label 70 labeled 15 to send the encrypted data to the VHF FM #1 software component and receive encrypted data from the VHF FM #1 software component using back-end input 90 labeled message label 24.

In order for the front-end input 80 and back-end input 90 message labels to locate the resource elements 70 a message routing table 60 is provided with a listing of all resource elements 70 available for access. Associated with each resource element 70 in the message routing table 60 is a memory location in which the resource element 70 is located and system identifier indicating which computer has the resource element 70. However, this message routing table 60 would vary according to the computer architecture used.

FIG. 4 is a flowchart showing the operations of the mission interface manager 20 and the resource manager 30 as discussed above using a radio subsystem 15 as an example application. The mission interface manager 20 begins execution in operation 100 by receiving a radio channel reconfiguration request from the man-machine interface 10. The mission interface manager 20 passes this request to the resource manager 30 where the mission interface manager 20 determines if this request can be supported using the active radio threads 95 that are currently executing. If the request can be processed using a currently active thread 95, then processing proceeds to operation 120. In operation 120 the appropriate message label front-end input 80 is selected from the message allocation table 50 and transmitted to the resource element 70 along with parameters such as frequency, net information, etc. required by the resource elements 70. Success of the reconfiguration results is reported to the mission interface manager 20 that in turn reports the results to the man-machine interface 10 and thus to the user in operation 270.

If the current radio threads 95 are unable to support the request then processing proceeds to operation 130 where it is determined if the current channel is allocated. If the current channel is allocated, then in operation 140 the current radio thread 95 is stopped and the resource elements 70 are deallocated in operation 150. Regardless of whether the current channel is allocated, processing proceeds to operation 160 where it is determined whether the resource elements 70 exist for the desired new thread. If the resource elements 70 exist, then processing proceeds to operation 170 where the resource elements 70 are allocated. Operation 170 entails looking up the command or request in the resource database 40 and determining which resource elements 70 are needed. Thereafter, in operation 180, the required message labels and parameters required would be identified in the message allocation table 50 and transmitted to the resource elements 70 in operation 190. Location of the resource elements 70 would be determined by looking up the resource element 70 in the message routing table 60. With the new thread 95 configured and started, the individual resource elements 70 would transmit and receive front-end input 80 and back-end input 90 message labels to execute the desired command. Success of the reconfiguration results is reported to the mission interface manager 20 that in turn reports the results to the man-machine interface 10 and thus to the user in operation 270.

If it is determined in operation 160 that resource elements 70 do not exist for the new thread 95, then processing proceeds to operation 200 where it is determined if moving a thread 95 will generate the required resource elements 70. If such movement of a thread 95 would generate the required resource elements 70, then processing proceeds to operation 210 where the thread 95 is stopped. The resource elements 70 of that thread 95 are deallocated in operation 220. In operation 170, as discussed earlier, the resource elements 70 are allocated. Thereafter in operation 180 the required message labels and parameters required would be identified in the message allocation table 50 and transmitted to the resource elements 70 in operation 190. Once the new thread 95 is activated the resource elements 70 for the stopped thread 95 are allocated in operation 170 as discussed earlier. Again, operation 180 determines the required message labels and parameters required which are identified in the message allocation table 50 and transmitted to the resource elements 70 in operation 190. Success of the reconfiguration results is reported to the mission interface manager 20 that in turn reports the results to the man-machine interface 10 and thus to the user in operation 270.

If movement of a thread 95 would not release the resource elements needed to create the requested thread 95 in operation 200 then processing proceeds to operation 230 where it is determined if the requested thread's 95 priority exceeds that of any other thread 95 that is active. If the requested thread 95 has a higher priority, then processing proceeds to operation 240 where the lower priority thread 95 is stopped and its resources are deallocated in operation 250. In operation 170, as discussed earlier, the resource elements 70 are allocated. Thereafter, in operation 180, the required message labels and parameters required would be identified in the message allocation table 50 and transmitted to the resource elements 70 in operation 190. The resource elements 70 are located using the message routing table 60 and the message labels are routed as previously discussed. Success of the reconfiguration results is reported to the mission interface manager 20 that in turn reports the results to the man-machine interface 10 and thus to the user in operation 270.

If no other active thread 95 has a lower priority, then processing proceeds from operation 230 to operation 260 where it is determined if an old channel was deallocated and by reallocating it the resource elements 70 would then be available. If an old channel was deallocated then processing proceeds to operation 170 where, as discussed earlier, the resource elements 70 are allocated. Thereafter, in operation 180, the required message labels and parameters required would be identified in the message allocation table 50 and transmitted to the resource elements 70 in operation 190. The resource elements 70 are located using the message routing table 60 and the message labels are routed as previously discussed. Success of the reconfiguration results is reported to the mission interface manager 20 that in turn reports the results to the man-machine interface 10 and thus to the user in operation 270.

However, if it is determined in operation 230 that an old channel was not deallocated, then processing proceeds to operation 270 where the failure of the reconfiguration results is reported to the mission interface manager 20 that in turn reports the results to the man-machine interface 10 and thus to the user.

FIG. 5 is an alternate embodiment of the invention, wherein the application no longer applies strictly to a radio subsystem, but instead is a more general software application where a very large number of threads 95 may be configured and executed simultaneously. This would be the case in a business or governmental application in which many users are accessing a system such as, but not limited to, an automated flight reservation system. The embodiments of the present invention would prove most useful in such a system since it would enable the configuration of threads 95 based on the needs of individual client requests such as arrival and departure information for a known flight requests which would only require a database access resource element 70. In the case where online reservations are required, the embodiments of the present invention would also add a credit card approval resource element 70 to the system as well as possibly other resource elements 70.

Referring to FIG. 5, the man-machine interface 10, shown in FIG. 1, would receive a command or instruction to perform a certain function in operation 300. In this alternate embodiment of the present invention the user could possibly access the man-machine interface 10 over the Internet through a browser located on the user's local system or server. The mission interface manager 20 would receive the command and pass it to the resource manager 30. In operation 320, the resource manager 30 would lookup the command in the resource database 40 and determine the resource elements 70 needed to configure the thread 95 requested. Once the resource elements 70 needed are determined, then in operation 330 the message allocation table 50 is accessed to determine the message labels needed to activate and communicate with each resource element 70. Thereafter in operation 340, the required parameters per message label are determined. In our example automated flight reservation system, which would take the place of the radio subsystem 15 shown in FIG. 1, these parameters may be flight number and date which would be supplied by the user through the man-machine interface 10. In operation 350, the message labels front-end input 80 would be transmitted to the resource elements 70 using message routing table 60. This would serve to activate the resource elements 70 no matter where in a computer network they are located as previously discussed.

Still referring to FIG. 5, in operation 360 a determination is made if all resource elements 70 have been activated. If all resource elements 70 have not been activated then processing proceeds to operation 330 and repeats until all resource elements required for a particular thread 95 are active. Once all resource elements 70 are active, processing for the resource manager 30 terminates in operation 420.

As previously discussed, each resource element 70 would communicate to all others activated in a given thread 95 using front-end input 80 message labels and back-end input 90 message labels as shown and discussed in reference to FIG. 2. The thread 95 would remain active until the resource manager 30 received a command to deactivate it and release the resource elements 70 used.

Using the embodiments of the present invention, software threads 95 may be configured with only the software (resource elements 70) necessary to accomplish a specific task or function and at the time the desired task or function is requested. The embodiments of the present invention thereby eliminate the need for the creation and testing of large software programs requiring extensive development, testing and debug time. Further, the a mount of memory utilized to execute one or more threads 95 is kept to a minimum. This is accomplished by using message labels to activate and allow communications between software resource elements 70. In the event of hardware failures, threads 95 may be configured to utilize the remaining resources and thereby allow operations to continue.

While we have shown and described only a few examples herein, it is understood that numerous changes and modifications as known to those skilled in the art could be made to the present invention. For example, reference has been made to the use of a man-machine interface 10, however, the present invention is not limited to such a device and may instead communicate to another computer or piece of software located local to the system or remotely. Further, the present invention may be used for any software application which may be divided into individual software modules as previously discussed. Therefore, we do not wish to be limited to the details shown and described herein, but intend to cover all such changes and modifications as are encompassed by the scope of the appended claims.

I claim:

1. A system to configure a thread to perform a specific function, comprising:

a mission interface manager to receive a request to generate a thread that performs the specific function; and a resource manager, in communication with the mission interface manager, to identify a plurality of resource elements required to generate the thread, to generate a plurality of message labels including a plurality of front-end message labels having a message element and a plurality of parameters, and a plurality of back-end message labels having a message element and a plurality of parameters, and to transmit the plurality of message labels to the plurality of resource elements to form the thread, the plurality of resource elements are activated upon receipt of the plurality of message labels, each of the plurality of resource elements both receives the message label from at least one of the plurality of resource elements and generates the message labels to transmit to at least one of the plurality of resource elements, the plurality of resource elements in the thread communicating to each other using the plurality of message labels, wherein the thread is the plurality of resource elements activated to perform the specific function.

2. The system recited in claim 1, wherein the plurality of resource elements communicate to each other using the plurality of front-end input message labels and the plurality of back-end input message labels.

3. The system recited in claim 1, wherein the resource manger deactivates the plurality of resource elements in the thread and deallocates the plurality of resource elements in the thread upon receipt of a command from a user through the mission interface manager, or upon receipt of a command from the mission interface manager to activate a higher priority thread that requires a resource element of the plurality of resource elements in the thread.

4. The system recited in claim 3, wherein the resource manager moves the thread to reallocate resource elements requested by a second thread by deactivating and deallocating the plurality of resource elements in the thread and allocating and activating a different set of resource elements to the thread.

5. The system recited in claim 1, further comprising:
a resource data base comprising a list of requests associated with a plurality of resource elements, wherein the resource database is accessed by resource manager to identify the plurality of resource elements required to generate the thread.

6. The system recited in claim 1, further comprising:
a message allocation table comprising a list of resource elements associated with the plurality of front-end input message labels and the plurality of back-end input message labels, wherein the message allocation table is accessed by the resource manager and the plurality of resource elements to generate the plurality of front-end input message labels and the plurality of back-end input message labels.

7. The system recited in claim 6, further comprising:
a message routing table comprising a list of the plurality of resource elements associated with a memory location and computer system where the plurality of resource elements may be found, wherein the message routing table is accessed by the plurality of message labels to determine where the plurality of resource elements are located.

8. A computer program executable by a computer and embodied on a computer readable medium to configure a thread to perform a specific function, comprising:
a mission interface manager code segment to receive a request to generate a thread that performs the specific function; and
a resource manager code segment, in communication with the mission interface manager code segment, to identify a plurality of resource elements required to generate the thread, to generate a plurality of message labels including a plurality of front-end message labels having a message element and a plurality of parameters, and a plurality of back-end message labels having a message element and a plurality of parameters, and to transmit the plurality of message labels to the plurality of resource elements to form the thread, the plurality of resource elements are activated upon receipt of the plurality of message labels, each of the plurality of resource elements both receives the message label from at least one of the plurality of resource elements and generates the message labels to transmit to at least one of the plurality of resource elements, the plurality of resource elements in the thread communicating to each other using the plurality of message labels, wherein the thread is the plurality of resource elements activated to perform the specific function.

9. The computer program recited in claim 8, wherein the plurality of resource elements communicate to each other using the plurality of front-end input message labels and the plurality of back-end input message labels.

10. The computer program recited in claim 8, wherein the resource manger code segment deactivates the plurality of resource elements in the thread and deallocates the plurality of resource elements in the thread upon receipt of a command from a user through the mission interface manager code segment, or upon receipt of a command from the mission interface manager code segment to activate a higher priority thread that requires a resource element of the plurality of resource elements in the thread.

11. The computer program recited in claim 8, wherein the resource manager code segment moves the thread to reallocate resource elements requested by a second thread by deactivating and deallocating the plurality of resource elements in the thread and allocating and activating a different set of resource elements to the thread, wherein the deactivating, deallocating of the plurality of resource elements and allocating and activating a different set of resource elements is accomplished using the plurality of message labels.

12. The computer program recited in claim 8, further comprising:
a resource data base comprising a list of requests associated with a plurality of resource elements, wherein the resource database is accessed by resource manager to identify the plurality of resource elements required to generate the thread.

13. The computer program recited in claim 8, further comprising:
a message allocation table comprising a list of resource elements associated with the plurality of front-end input message labels and the plurality of back-end input message labels, wherein the message allocation table is accessed by the resource manager and the plurality of resource elements to generate the plurality of front-end input message labels and the plurality of back-end input message labels.

14. The computer program recited in claim 13, further comprising:
a message routing table comprising a list of the plurality of resource elements associated with a memory location and computer system where the plurality of resource elements may be found, wherein the message routing table is accessed by the plurality of message labels to determine where the plurality of resource elements are located.

15. A system to configure a thread to perform a specific function, comprising:
a mission interface manager to receive a request to generate a thread, comprising a plurality of resource elements, that performs the specific function, and
a resource manager, in communication with the mission interface manager, to identify a plurality of resource elements required to generate the thread, to generate a plurality of message labels, and to transmit the plurality of message labels to the plurality of resource elements to form the thread, the plurality of resource elements are activated upon receipt of the plurality of message labels, each of the plurality of resource elements both receives the message label from at least one of the plurality of resource elements and generates the message labels to transmit to at least one of the plurality of resource elements, the plurality of resource elements in the thread communicating to each other using the plurality of message labels, the resource manager deactivates the plurality of resource elements in the thread and deallocates the plurality of resource elements in the thread upon receipt of a command from a user through the mission interface manager, or upon receipt of a command from the mission interface manager to activate a higher priority thread that requires a resource element of the plurality of resource elements in the thread, the resource manager moves the thread to reallocate resource elements requested by a second thread by deactivating and deallocating the plurality of resource elements in the thread and allocating and activating a different set of resource elements to the thread, wherein the thread is the plurality of resource elements activated to perform the specific function.

16. The system recited in claim 15, wherein the plurality of message labels further comprises:

a plurality of front-end input message labels comprising a resource element and a plurality of parameters; and a plurality of back-end input message labels comprising a resource element and a plurality of parameters.

17. The system recited in claim 16, further comprising:

a message allocation table comprising a list of resource elements associated with the plurality of front-end input message labels and the plurality of back-end input message labels, wherein the message allocation table is accessed by the resource manager and the plurality of resource elements to generate the plurality of front-end input message labels and the plurality of back-end input message labels.

18. The system recited in claim 17, further comprising:

a message routing table comprising a list of the plurality of resource elements associated with a memory location and computer system where the plurality of resource elements may be found, wherein the message routing table is accessed by the plurality of message labels to determine where the plurality of resource elements are located.

* * * * *